United States Patent [19]
Mojden et al.

[11] Patent Number: 5,441,382
[45] Date of Patent: Aug. 15, 1995

[54] INFEED APPARATUS FOR ARTICLE HANDLING SYSTEM

[75] Inventors: Andrew E. Mojden, Hinsdale; Richard P. Hoinacki, Oak Lawn, both of Ill.

[73] Assignee: Fleetwood Systems, Inc., Romeoville, Ill.

[21] Appl. No.: 11,381

[22] Filed: Jan. 29, 1993

[51] Int. Cl.⁶ ............................................. B65G 59/00
[52] U.S. Cl. .................... 414/798.9; 198/419.1; 414/798.4
[58] Field of Search ............... 414/798.2, 798.4, 798.5, 414/798.7, 798.8, 798.9; 294/116; 198/419.1

[56] References Cited

U.S. PATENT DOCUMENTS

| 2,878,419 | 3/1959 | Jones | 198/419.1 |
| 3,811,549 | 5/1974 | Presig | 414/798.9 |
| 3,826,348 | 7/1974 | Presig et al. | 414/798.9 |
| 3,878,945 | 4/1975 | Mojden et al. | 414/798.5 |
| 4,234,223 | 11/1980 | O'Neil | 294/116 |
| 4,299,532 | 11/1981 | Bouwmeester | 294/116 |
| 4,611,705 | 9/1986 | Fluck | 414/798.9 |
| 4,674,934 | 6/1987 | Honger | 414/798.2 |
| 4,723,883 | 2/1988 | Smith | 414/798.2 |
| 4,772,003 | 9/1988 | Nobuta et al. | 414/798.7 |
| 4,869,359 | 9/1989 | Müller et al. | 414/798.9 |
| 4,921,088 | 5/1990 | Ter Horst | 198/419.1 |
| 4,979,870 | 12/1990 | Mojden et al. | 414/788.4 |
| 5,095,684 | 5/1992 | Walker et al. | 414/798.2 |
| 5,102,287 | 4/1992 | Johnson et al. | 294/116 |
| 5,119,617 | 6/1992 | Mojden et al. | 53/500 |

FOREIGN PATENT DOCUMENTS

| 1144522 | 3/1969 | United Kingdom | 414/798.7 |
| 648449 | 2/1979 | U.S.S.R. | 414/798.7 |

Primary Examiner—Michael S. Huppert
Assistant Examiner—Gregory A. Morse
Attorney, Agent, or Firm—Trexler, Bushnell, Giangiorgi & Blackstone, Ltd.

[57] ABSTRACT

An infeed apparatus for an article handling system includes an infeed lane for guiding a flow of articles in a facewise nested condition. A separating station is located along the infeed lane for receiving the flow of articles and a separating device located adjacent the separating station separates the articles into groups of articles of a predetermined length. A shuttle receives a group of articles from the separating device and transports the group of articles to an infeed station located along the infeed lane at a location remote from the separating station. A trailing end hold-up engages a trailing end of a group of articles in the infeed station to permit the shuttle to return to the separating station to receive a subsequent group of articles.

15 Claims, 4 Drawing Sheets

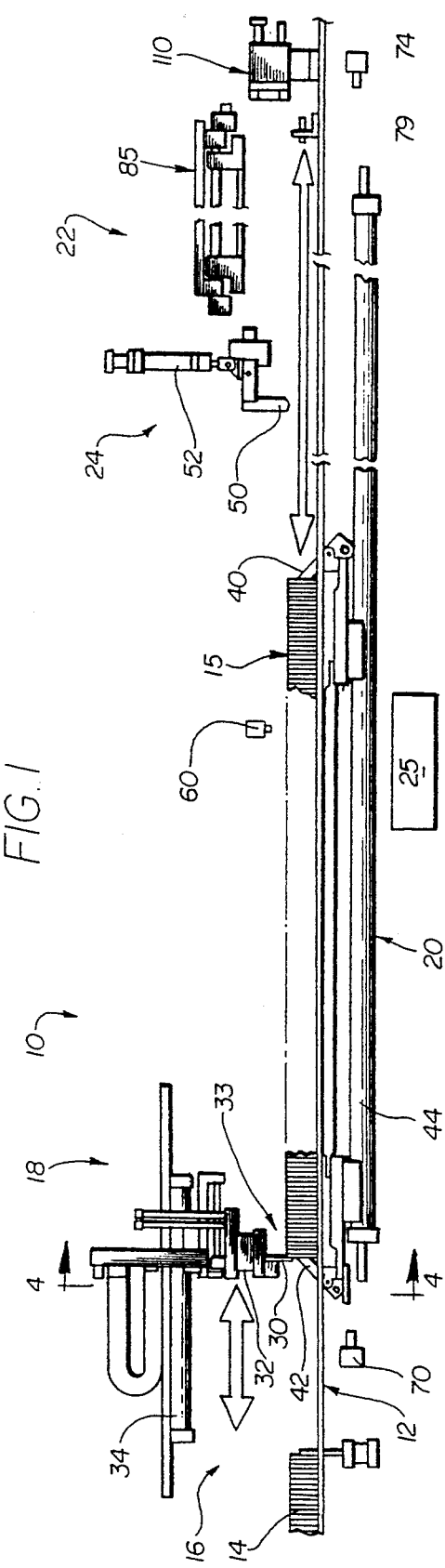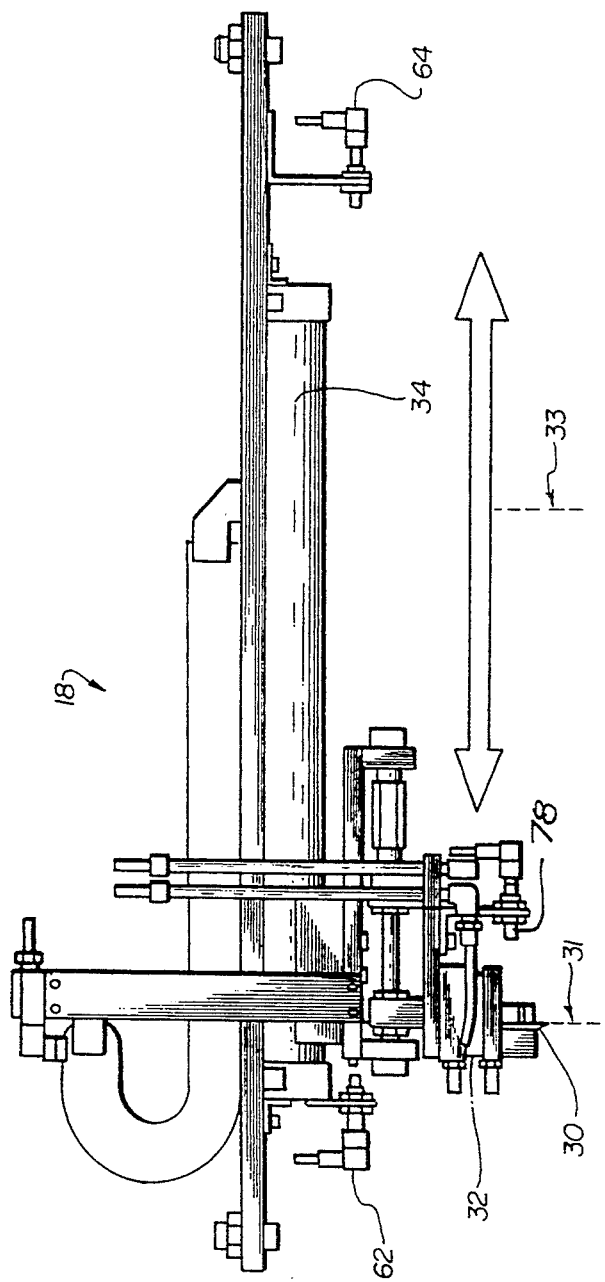

INFEED APPARATUS FOR ARTICLE HANDLING SYSTEM

BACKGROUND OF THE INVENTION

This invention is directed generally to an article handling system of the type for handling articles such as can ends or the like and more particularly to a novel infeed apparatus for receiving a continuous flow of articles to an article handling system and separating the articles into groups of articles of a predetermined length for subsequent handling in the system.

While the invention may find other uses, the invention will be particularly described in connection with an article handling system of the type generally shown and described in prior U.S. Pat. No. 4,979,870 which is commonly owned herewith. In this prior patent there is illustrated and described an automatic tray loading, unloading and storage system for loading articles from a first location into trays and for thereafter unloading the articles from the trays for transport to a second location. This system compensates for differences between the rate of supply of articles from the first location and the rate of demand for articles at the second location, in that articles can either be stored in the trays or removed from the trays as necessary to compensate for the differences in these two rates.

An infeed apparatus generally comprises multiple infeed lanes for simultaneously feeding a continuous flow of articles into an input portion or tray loading station of this article handling system. In order to load the articles into trays, it is necessary that the incoming essentially continuous flow of articles be separated into individual groups of articles, each of a predetermined length, such that these groups of articles may be individually loaded into tray. While the above mentioned patent illustrates and describes one infeed system for accomplishing this end, there remains room for improvement.

As more fully described in the above-mentioned U.S. patent such article handling systems find particular utility in the manufacture of containers such as beverage cans or the like, wherein a great number of can end parts are required. In the filling and closure of beverage containers as well as other containers for food, petroleum products, or the like, it is necessary to assemble the end parts of the cans or containers with the body parts thereof. Accordingly, apparatus have heretofore been devised for fabricating and thereafter handling, stacking, packaging and unpackaging can ends both during their manufacture and for further processing both prior to and up to their final assembly with can bodies in the filling and closure operation. Groups of can ends of a given length are normally packaged in kraft paper bags for handling and transport between their fabrication and use. Prior to use, the packaging is removed. The article handling system of the above-mentioned patent is particularly useful for compensating for differences in the flow of can ends between various stations in the can end fabrication operation. Generally speaking this operation includes a number of stages, including shell presses for initial formation of the can ends, a station for applying some protective lining materials or substances especially for use in some beverage and food applications, and a station for the fitting of pull rings or the like to tear-away openings of the type used in many beverage and food container applications.

Accordingly, a modern can end fabrication operation requires that large numbers of these can ends be handled and transported from one station to the next in their fabrication process up to and including packaging for delivery to the filling and closure operation. These operations require that the can ends be transported from one station to the next in a continuous process and in relatively high volume.

One problem which arises in the handling of such can ends is the maintaining of the can ends in a facewise nested or stacked condition for maximum efficiency of transport between the various parts of the fabrication operation described above and also for maximum efficiency in packaging and subsequent handling up to and including handling by the end user. However, the graspable tabs or rings provided in association with the tear-away top portion of such can ends may cause the ends to tilt or cant somewhat during handling. Should the ends spread apart somewhat during handling it is possible that one or more of the can end members may tilt or cant out of alignment or even come loose completely from the remaining members in an otherwise continuous flow or nested group or stack. Such tilting and disruption of a continuous flow or nested stacks of ends during handling can delay the operation or even cause damage and require shut down of equipment and attendant delay which can be quite costly, given the rapid pace and high efficiency generally required of such operations.

Advantageously, the novel and improved infeed apparatus of the present invention addresses the foregoing problems and considerations in the handling of can ends. In particular, the invention facilitates the process of separating can ends into individual groups of a predetermined length from an incoming, more-or-less continuous flow of can ends and delivering these groups to an infeed station or portion of an article handling apparatus, which may be of a general type illustrated and described in the above-referenced U.S. Pat. No. 4,979,870. It will be appreciated, however, that the infeed apparatus of the invention may find utility in connection with other article handling systems or other apparatus without departing from the invention.

OBJECTS AND SUMMARY OF THE INVENTION

Accordingly, it is a general object of this invention to provide a novel and improved infeed apparatus for an article handling system.

A more specific object is to provide an infeed apparatus which efficiently separates articles from a generally continuous flow of articles into individual groups of a predetermined length and delivers these groups to the infeed of further article handling apparatus.

Briefly, and in accordance with the foregoing objects, an infeed apparatus for an article handling system comprises an infeed lane for guiding a flow of articles in a facewise nested condition; a separating station located along said infeed lane for receiving said flow of articles in said infeed lane; separating means located adjacent said separating station for separating said articles into groups of articles of a predetermined length; shuttle means for receiving a group of articles from said separating means and for transporting said group of articles to an infeed station located along said infeed lane at a location remote from said separating station; and trailing end hold-up means for engaging a trailing end of said group of articles in said infeed station to permit said shuttle means to return to said separating station to receive a subsequent group of articles.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

FIG. 1 is a side elevation, somewhat diagrammatic in form, of infeed apparatus in accordance with the invention in connection with an infeed portion of an article handling system;

FIG. 3 is an enlarged side elevation showing further details of a separating portion of the apparatus of the invention;

DETAILED DESCRIPTION OF THE ILLUSTRATED EMBODIMENT

Figure 2:
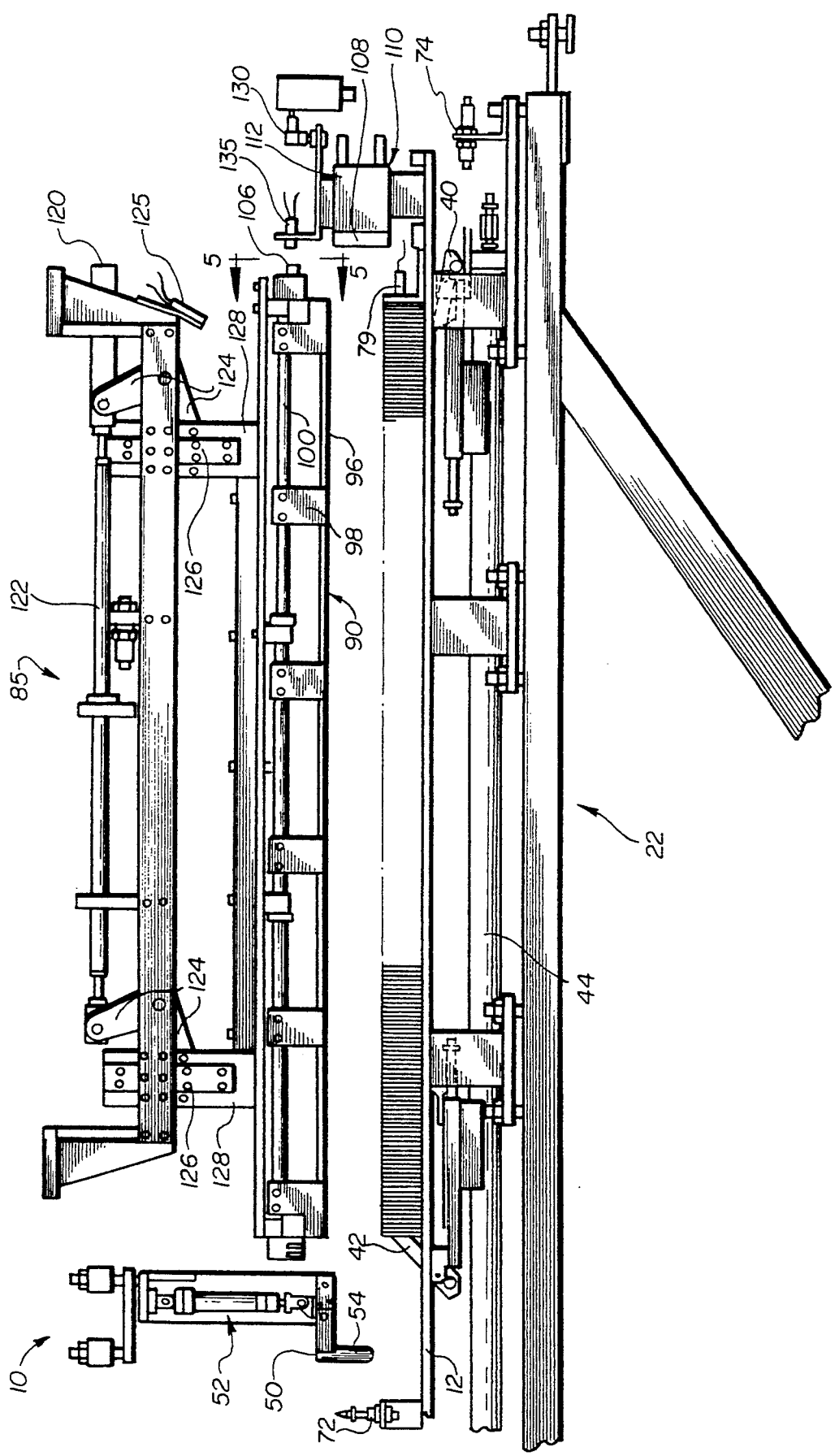
FIG. 2 is an enlarged side elevation similar to FIG. 1, showing further detail of an infeed station portion of the apparatus of the invention in connection with a pick-and-place device.

Referring now to the drawings and initially to FIGS. 1-3, and infeed apparatus for an article handling system is designated generally by the reference numeral 10. The apparatus 10 includes an elongate infeed lane 12 for receiving and guiding a flow of articles 14 such as can ends which are in a facewise nested condition. At a first or separating station 16 located along the infeed lane 12, the flow of articles 14 is received. A separating means or apparatus 18 is located adjacent and preferably immediately above the separating station 16 for separating the articles 14 into groups of articles of a predetermined length. One such group of articles or "stick" as the term is used in the art, is indicated in FIG. 1 by the reference numeral 15. This separating into groups of articles is such that the articles may be thereafter handled in essential uniform groups of the same predetermined length and hence number of articles, through later portions of an article handling system to which the infeed apparatus 10 of the invention provides a supply of articles separated into such groups.

The infeed apparatus of the invention further includes shuttle means 20 for receiving a group 15 of articles from the separating means 18 and transporting the group of articles along the infeed lane 12 to an infeed station 22. This infeed station 22 is located along the infeed lane 12 at some distance from the location of the separating station 16. A trailing end hold-up means or apparatus 24 is provided at the infeed station 22 for engaging a trailing end of a group 15 of articles in the infeed station 22 so as to permit the shuttle means 20 to return to the separating station 16 to receive a subsequent group of articles.

Control means 25, diagrammatically indicated in FIG. 1, are provided for operating the separating means 18, the shuttle means 20 and the hold-up means 24 in a predetermined sequence comprising actuating the separating means to separate a group 15 of articles and deliver this group of articles to the shuttle means 20, then actuating the shuttle means to transport the group 15 of articles to the infeed station 22, and finally actuating the trailing end hold-up means 24 to engage and support the trailing end of the group 15 of articles in the infeed station. Thereupon, the shuttle means 20 is returned to the separating station 16 to receive a subsequent group of articles.

Figure 4:
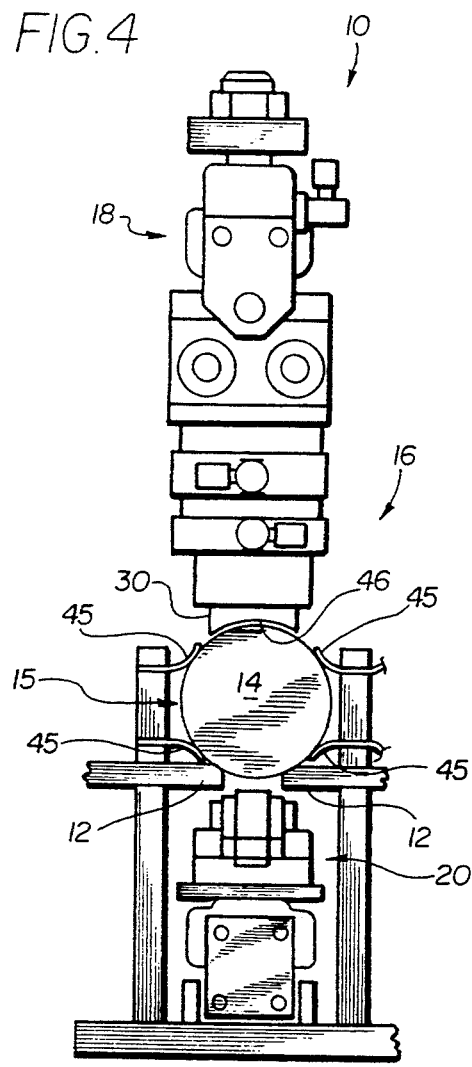
FIG. 4 is an enlarged elevation, taken generally along the line 4—4 of FIG. 1.
Figure 5:
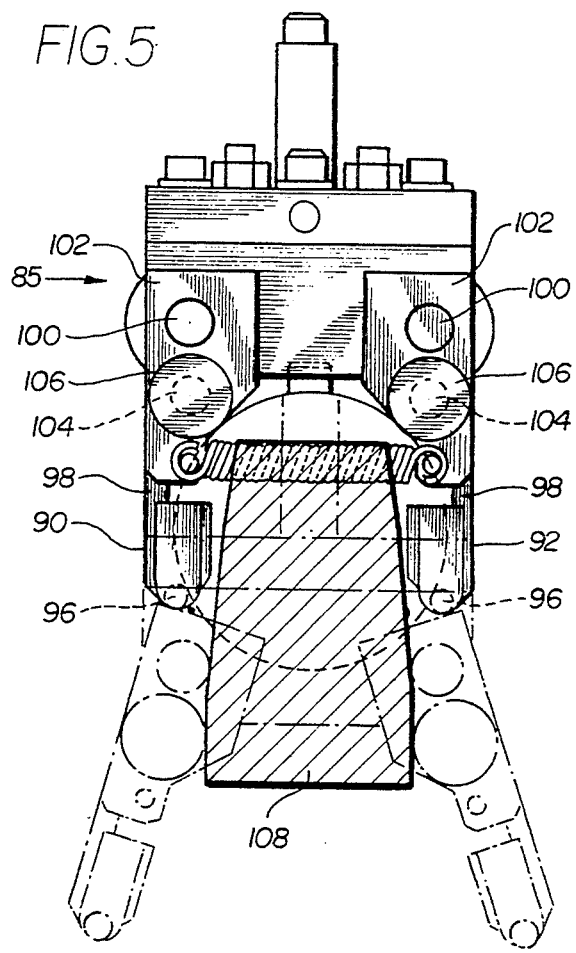
FIG. 5 is an enlarged partial elevation taken generally along the line 5—5 of FIG. 2 showing further details of a portion of the pick-and-place device.
Figure 6:
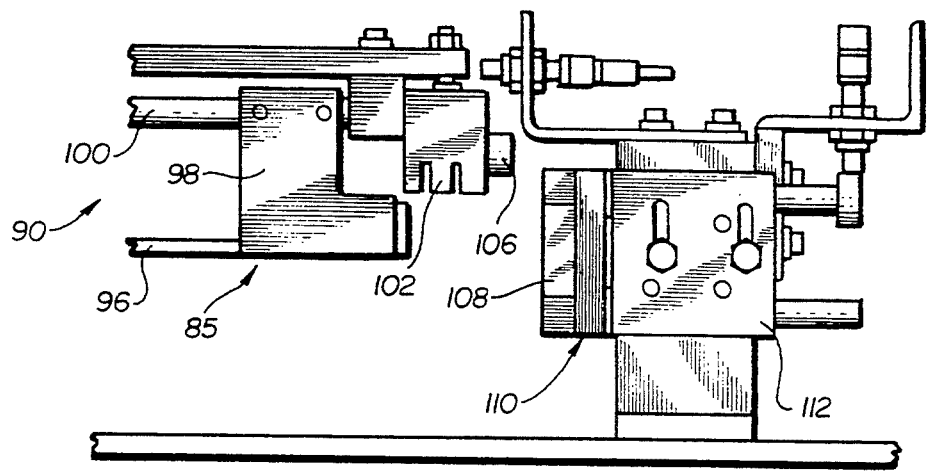
FIGS. 6 and 7 are enlarged partial side elevations illustrating further details of the pick-and-place device.
Figure 7:
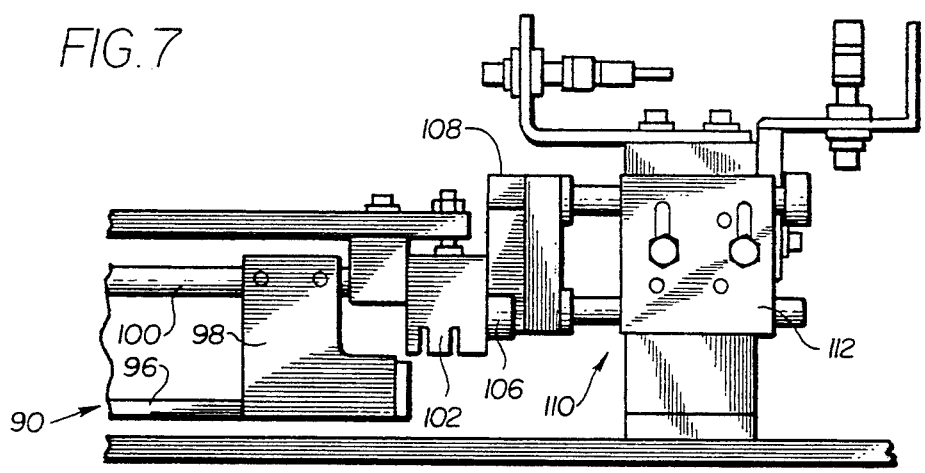

Referring now also to FIGS. 3 and 4, the separating means will be seen to comprise cut-off knife means 30, which is configured for entering between and separating the articles in the incoming flow of articles 14, so as to separate the articles into the groups 15 of predetermined length. Also provided is a vertical drive means 32 which is configured and located for moving or driving the cut-off knife means 30 bidirectionally between a rest position wherein the cut-off knife 30 is spaced above the articles 14 and an extended position wherein the cut-off knife 30 is driven downwardly to extend between two of the articles in the flow of articles 14 to thereby separate the articles. In addition, horizontal drive means 34 is provided for transporting the cut-off knife 30 bidirectionally in a generally horizontal direction generally in parallel with the infeed lane 12 between a cut-off position 31 adjacent a flow of articles in the infeed lane prior to said shuttle means and a second position 33 adjacent a trailing end of the shuttle means 20 for the transporting a trailing end of the group 15 of articles separated out at the separating station to a position in which the group 15 of articles is fully within the shuttle means 20.

In this regard, the shuttle means 20 includes a leading end support 40 projectable into the infeed lane 12 for supporting a leading end of the group 15 of articles and a trailing end support 42 spaced from the leading end support 40 by a distance approximately equal to the length of the group 15 of articles and also projectable into the infeed lane 12 for supporting a trailing end of the group 15 of articles. A linear actuator member 44 is provided for moving the leading end support 42 bidirectionally between the separating station 16 and the infeed station 22. The above-described horizontal drive means 34 for the cut-off knife 30 is also preferably a similar, although shorter, linear actuator.

Both the leading end support 40 and trailing end support 42 are retractable relative to the infeed lane 12 to permit the return of the shuttle 20 from the infeed station 22 to the separating station 16 to receive a subsequent group of articles without any interference with either a group 15 of articles in the infeed station 22 or with incoming articles in the separating station 16. To this end, both of the supports 40 and 42 are generally pivotally mounted and spring biased to a condition projecting into the infeed lane 12. However, it will be seen that these members are spring biased into a generally angled attitude relative to the infeed lane 12 such that upon encountering a group articles while moving in one direction, either of the supports will pivot downwardly and out of the infeed lane to pass by the articles without interference. This will take place with respect to the leading end support 40 when a group of articles is encountered while entering the infeed station 22, such that the support 40 will retract to ride under these articles while the trailing end support 42 will continue to propel a group 15 of articles in the shuttle fully into the infeed station 22, whereupon a trailing end of the group 15 may be engaged by the trailing end hold-up apparatus 24. Similarly, upon the return motion of the shuttle 20, the trailing end hold-up will readily retract upon initially encountering the group of articles in the separating station 12. When the cut-off knife has advanced the articles through the separating station 12 to a point where a trailing end thereof rides over or clears the trailing end support 42 the support will again be spring biased upwardly to engage the trailing end of this new group 15 of articles.

Preferably, the linear actuator 44 propels or moves the leading end support 40 and trailing end support 42 at a linear velocity greater the linear velocity of the flow of articles 14 being received at the separating station 12. Similarly, the horizontal drive means or linear actuator 36 drives the cut-off knife at a linear velocity greater than the linear velocity of the flow of the articles 14 which are received at separating station 12.

Referring again to FIG. 4, plurality of hold-up strips 45 are provided along the entire length of the separating station 16 to hold the incoming articles in an upright position, prior to engagement to the leading end of the group of articles with the leading end support 40 of the shuttle 20. These hold-up strips preferably comprise flexible rubber-like material and are arranged to engage the articles 14 at four points about their periphery to assure that the articles will be held in an upright position on the lanes 12. The hold-up strips hold the articles in an upright, facewise nested condition as the articles flow into the separating station. In this regard it will be seen that the lanes 12 comprise a pair of generally parallel and spaced generally flat rail members which slidably engage the articles 14 as they are transported therealong by the cut-off knife and shuttle means respectively. Additionally, as best viewed in FIG. 3, the cut-off knife 30 has a leading edge 46 which engages or separates the articles and which has a complementary configuration to an outer edge surface of the articles for projecting relatively smoothly therebetween for separating and thereafter engaging and propelling a trailing end of the articles up to the trailing end support 42 of the shuttle 20. This leading edge or surface 46 of the cut-off knife 30 is polished and preferably has an edge radius approximately the same as the edge or curl radius of a can end, when a can end comprises one of the articles 14.

Figure 8:
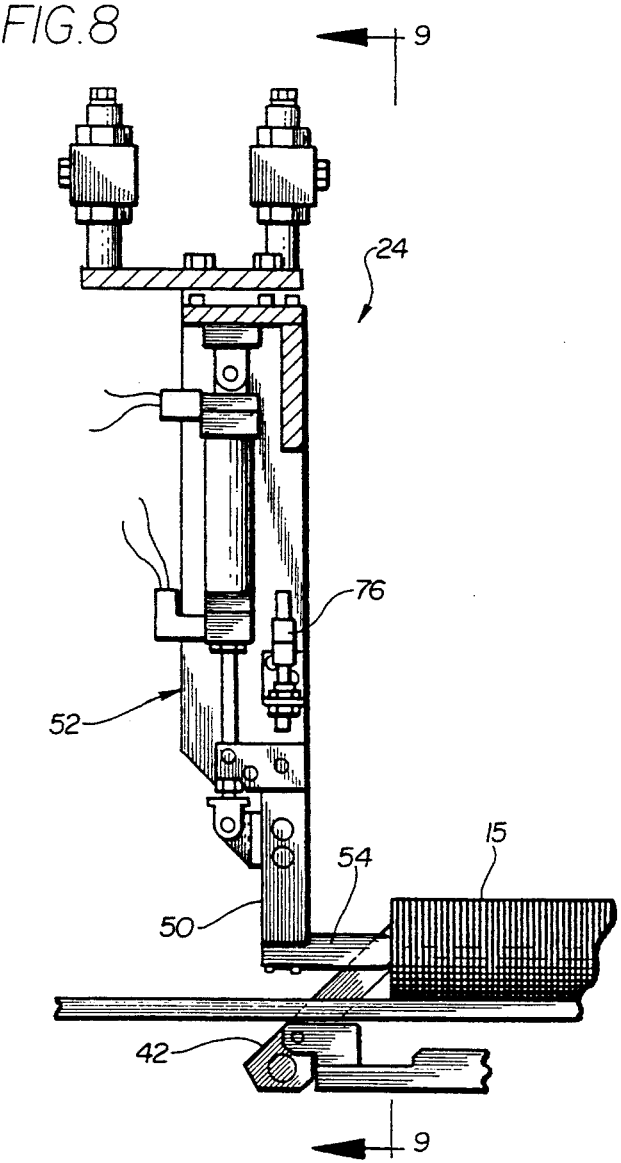
FIG. 8 is an enlarged side elevation showing further details of a trailing end hold-up portion of the apparatus of the invention.
Figure 9:
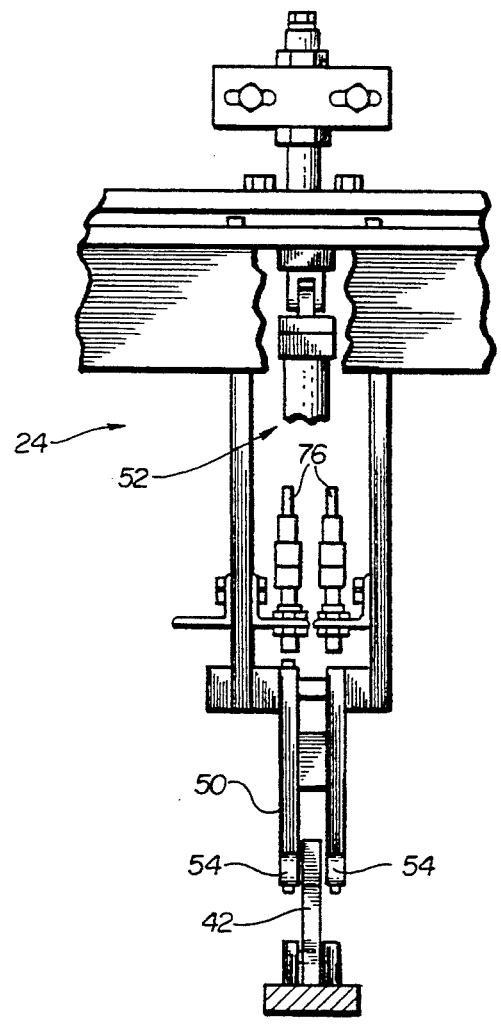
FIG. 9 is an end view taken generally in the plane of the line of 9—9 of FIG. 8.

Referring now also to FIGS. 8 and 9, the trailing end hold-up means 24 comprises a hold-up member 50 and hold-up actuator means 52 for moving hold-up member 50 between a rest position, as illustrated in FIG. 1, out of engagement with a group of articles and a hold-up position, as illustrated in FIG. 8, for engagement with and support of a trailing end of a group 15 of articles in the infeed station 22. As best viewed in FIG. 9, the hold-up member 50 and the trailing end support 42 of the shuttle 20 are of complementary configuration for simultaneously engaging a trailing end of a group of articles 15 and the infeed station 22. As best viewed in FIG. 9, the hold-up member 50 is configured as a pair of spaced-apart projecting fingers 54, such that the trailing end support 42 may fit between these fingers 54. Thus, once the fingers 54 have been moved into engagement with the articles in the infeed station 22, the shuttle 20 may be withdrawn.

In connection with operation of the control means 25 as briefly described hereinabove, a number of sensors or sensor means are provided in association with various parts of the above-described apparatus of the invention, in order to properly coordinate the sequence of operation thereof.

These sensors include a stick length sensor means 60 which is located at a distance from the rest or starting position of the horizontal travel of the cut-off knife corresponding to the desired length of a group of articles to be separated. The stick length sensor 60 develops a stick length control signal in response to incoming articles from the separating station reaching the predetermined length of a group of articles or stick 15. Cooperatively, the control means responds to this stick length control signal by actuating the vertical drive means for the cut-off knife to cause the cut-off knife to descend and separate the articles. Separating sensor means 62 and 64 develop signals corresponding to the position of the separating means, and more particularly of the cut-off knife 30 relative to its horizontal drive means or actuator 34, and relative to the separating station. The signals are utilized by the control means 25 to control the horizontal drive means 34 for the cut-off knife 30.

A shuttle home position sensor 70 produces a shuttle home control signal when the shuttle has reached a position fully returned to the separating station 16. Similarly, respective shuttle position sensors 72, 74 develop signals corresponding to the position of the shuttle 20, generally at either end of the infeed station 22 and develop corresponding shuttle control signals for use by the control means 25 in controlling operation of the linear actuator 44 for the shuttle 20. Finally, a pair of hold-up sensors 76 develop hold-up control signals corresponding to the position of the hold-up means 50 and in particular the position of the fingers 54, that is, either in engagement with a trailing end of the group 15 of articles or pulled upwardly and away from engagement therewith as illustrated respectively in FIGS. 9 and 2. A cut-off knife sensor 78 produces a cut-off control signal corresponding to the position of the cut-off knife, either spaced above the articles or can ends at its rest position or in the cut-off position where it extends between the articles for separating them. An additional infeed station full sensor 79 may also be provided for sensing the presence or absence of can ends at the leading end of the infeed station 22 and producing a corresponding signal for use by the control means 25. Thus, the control means utilizes all of the foregoing control signals for operating the separating means, the shuttle means end the trailing and hold-up means in the above-described sequence of operation.

Turning next to FIGS. 2, 4, 5 and 6, a pick-and-place apparatus or device 85 will next be described. This pick-and-place device 85 is configured for engaging and removing a group 15 of articles from the infeed station 22. The pick-and-place apparatus 85 comprises a pair of elongate, pivotally mounted gripping arms 90, 92 which generally form mirror images of each other. The arms 90 and 92 are mounted to pivot mutually inwardly for gripping and engaging the stack of articles 15 therebetween, and to pivot oppositely outwardly for either moving into position for engagement with the group of articles or for releasing a group of articles. With respect to the infeed station 22, the pick-and-place device will initially approach the articles with the arms in the closed condition and the arms will then be opened and then closed upon the articles when they are in the proper alignment therewith. Tension means preferably in the form of tension springs 94 across the respective ends of the gripping arms 90, 92 normally hold the arms in their closed condition. A novel cam track 108 and cam follower roller 106 are provided for overcoming the tension springs 94 and pivoting the gripping arms 90, 92 oppositely laterally outwardly to an open condition for passing over and around the group 15 of articles prior to gripping the same in the infeed station 22. It is noted that the gripping arms 90, 92 are also opened for releasing the group 15 of articles at another portion of the article handling apparatus which is not related to this application and will therefore not be further described herein.

Each of the gripping arms includes an elongate rod or rod-like member 96 which is pivoted inwardly and outwardly by a series of support arm or strut members 98 about a pivot rod or shaft 100. The pivot rods or shafts 100 are in turn coupled to an outboard control block member 102 which forms a part of the cam means for pivoting or opening the arms 90, 92 to the open position. Each of control blocks 102 mounts an outwardly projecting rod or shaft 104 which is preferably provided with a somewhat enlarged diameter cam follower roller member 106. These cam roller members 106 in turn engage a divergent cam track 108 which is formed on a separate cam track means or assembly 110 which is provided to one side of the pick-and-place device 90. These rollers 106 form a cam rider means for riding along the cam track 108. The cam track means or assembly 110 in turn includes a cam activator or drive means 112 for driving the cam track horizontally into and out of a position for engagement with the cam riders or rollers 106.

Thus, as the pick-and-place device 85 is lowered relative to infeed lane 12, the cam actuator or drive 112 advances the cam tracks 108 into a position for engagement with the cam riders or followers 106. This in turn causes the gripping arms 90, 92 to spread apart to move over and about a group of articles in the infeed station 22. Upon reaching a position completely surrounding the articles and fully advanced relative to the station 22, the cam member 108 is again withdrawn to permit the gripping arms to close upon and grippingly engage the group 15 of articles.

As best viewed in FIG. 2, the pick-and-place device is lifted and lowered by an assembly including a piston and cylinder 120 and elongate drive rod 122 and a pair of crank arm assemblies 124 which drive the assembly upwardly and downwardly in a slidable fashion relative to interengaged sliding block members 126, 128. The members 126 are fixedly mounted and the members 128 are coupled for slidable movement relative thereto and also coupled with the gripping arms 90, 92 and related assembly described above. Suitable sensors, such as proximity sensors, 125, 130 and 135 are provided for sensing the positions of the arms 90, 92, and the cam 108 and producing corresponding control signals for use by the control means 25 in controlling and coordinating the operation of cam 108 and of pick-and-place device 85.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. An infeed apparatus for an article handling system comprising: an infeed lane for guiding a flow of articles in a facewise nested condition; a separating station located along said infeed lane for receiving said flow of articles in said infeed lane; separating apparatus located adjacent said separating station for separating said articles into groups of articles of a predetermined length, said separating apparatus including a horizontal drive mechanism and an operatively attached cut-off device, said drive mechanism horizontally displacing said cut-off device, said cut-off device being positionable between two neighboring articles in said flow of articles for separating one of said groups of articles from said flow of articles, said horizontal drive mechanism moving said cut-off device positioned in said flow of articles for forming a gap between said flow of articles and a trailing end of said group of articles separated from said flow; shuttle apparatus for receiving a group of articles from said separating apparatus, said shuttle including an operatively attached trailing end support, said support being insertable into said gap for abutting and supporting said trailing end of said group of articles, said shuttle transporting said group of articles to an infeed station located along said infeed lane at a location remote from said separating station; and trailing end hold-up apparatus adjacent said infeed station for engaging said trailing end of said group of articles in said infeed station to retain said group of articles in a facewise nested condition in said infeed station while said shuttle returns to said separating station to receive a subsequent group of articles.

2. Apparatus according to claim 1 and further including control for operating said separating apparatus, said shuttle apparatus and said trailing end hold-up apparatus in a predetermined sequence comprising actuating said separating apparatus to separate a group of articles and deliver said group of articles to said shuttle apparatus, actuating said shuttle apparatus to transport said group of articles to said infeed station and then actuating said trailing end hold-up apparatus to engage and support said trailing end of said group of articles in said infeed station.

3. An infeed apparatus for an article handling system comprising: an infeed lane for guiding a flow of articles in a facewise nested condition; a separating station located along said infeed lane for receiving said flow of articles in said infeed lane; separating apparatus located adjacent said separating station for separating said articles into groups of articles of a predetermined length; shuttle apparatus for receiving a group of articles from said separating apparatus and for transporting said group of articles to an infeed station located along said infeed lane at a location remote from said separating station; and trailing end hold-up support adjacent said infeed station for engaging a trailing end of said group of articles in said infeed station to retain said group of articles in a facewise nested condition in said infeed station while said shuttle returns to said separating station to receive a subsequent group of articles, said separating apparatus having a cut-off knife, vertical drive mechanism for driving said cut-off knife, a vertical drive for driving said cut-off knife bidirectionally between a rest position, said cut-off knife being spaced from said articles and an extended position wherein said cut-off knife extends between two of said articles in said flow of articles, and horizontal drive mechanism for transporting said cut-off knife bidirectionally in a generally horizontal direction between a cut-off position adjacent a flow of articles in said infeed lane and a second position adjacent an end of said shuttle apparatus for transporting a group of articles from said cut-off position into said shuttle apparatus.

4. An infeed apparatus for an article handling system comprising: an infeed lane for guiding a flow of articles in a facewise nested condition; a separating station located along said infeed lane for receiving said flow of articles in said infeed lane; separating apparatus located adjacent said separating station for separating said articles into groups of articles of a predetermined length; a shuttle apparatus for receiving a group of articles from said separating apparatus and for transporting said group of articles to an infeed station located along said infeed lane at a location remote from said separating station, said shuttle apparatus having a leading end support projectable into said infeed lane for supporting a leading end of said group of articles; a trailing end support spaced from said leading end support and projectable into said infeed lane for supporting a trailing end of said group of articles; linear actuator apparatus for moving said leading end support and said trailing end support bidirectionally between said separating station and said infeed station; and trailing end hold-up structure adjacent said infeed station for engaging a trailing end of said group of articles in said infeed station to retain said group of articles in a facewise nested condition in said infeed station while said shuttle apparatus returns to said separating station to receive a subsequent group of articles.

5. Apparatus according to claim 4 wherein said leading end support and said trailing end support are retractable relative to said infeed lane for permitting return of said shuttle apparatus from said infeed station to said separating station to receive a subsequent group of articles without interference with a group of articles in said infeed station or incoming articles in said separating station.

6. Apparatus according to claim 4 wherein said linear actuator apparatus moves said leading end support and said trailing end support at a linear velocity greater than a linear velocity of said flow of articles received at said separating station.

7. Apparatus according to claim 3 wherein said horizontal drive apparatus transports said cut-off knife at a linear velocity greater than a linear velocity of said flow of articles received at said separating station.

8. Apparatus according to claim 1 wherein said trailing end hold-up apparatus comprises a hold-up member and hold-up actuator apparatus for moving said hold-up member between a hold-up position for engagement with a trailing end of a group of articles in said infeed station and a rest position out of engagement with said trailing end.

9. Apparatus according to claim 4 wherein said trailing end hold-up structure comprises a hold-up member and hold-up actuator for moving said hold-up member between a hold-up position in engagement with a trailing end of a group of articles in said infeed station and a rest position out of engagement with said trailing end, and wherein said hold-up member and said trailing end support of said shuttle apparatus are of complementary configuration for simultaneously engaging said trailing end of said articles in said infeed station, such that said hold-up member may engage the trailing end of said articles in said infeed station simultaneously with said trailing end support of said shuttle apparatus when said shuttle apparatus initially introduces said articles into said infeed station and thereafter said shuttle apparatus may be withdrawn to return to said separating station while said ends remain supported at a trailing end thereof by said hold-up member, without interference between said hold-up member and said shuttle apparatus.

10. Apparatus according to claim 3 wherein said cutoff knife has a leading edge engageable with said articles and having a complementary configuration to an outer edge surface of said articles.

11. Apparatus according to claim 2 and further including a stick length sensor for developing a stick length control signal in response to the articles flowing into said infeed lane reaching said predetermined length; a separating sensor for developing a separating control signal corresponding to the position of said separating apparatus relative to said separating station; a shuttle sensor for developing a shuttle control signal corresponding to the position of said shuttle apparatus relative to said separating station an said infeed station; and a hold-up sensor for developing a hold-up control signal corresponding to the position of said trailing end hold-up structure relative to a trailing end of said articles in said infeed station; said control being responsive to said control signals for operating said separating apparatus, said shuttle apparatus and said trailing end hold-up structure in said predetermined sequence.

12. Apparatus according to claim 1 and further including a plurality of resilient hold-up strips arranged in a generally parallel alignment with said infeed lane and running substantially the length of said separating station for engaging said articles and holding said articles in an upright, facewise nested condition as said articles flow into said separating station.

13. An infeed apparatus for an article handling system comprising: an infeed lane for guiding a flow of articles in a facewise nested condition; a separating station located along said infeed lane for receiving said flow of articles in said infeed lane; separating apparatus located adjacent said separating station for separating said articles into groups of articles of a predetermined length; a shuttle for receiving a group of articles from said separating apparatus and for transporting said group of articles to an infeed station located along said infeed lane at a location remote from said separating station; trailing end hold-up structure adjacent said infeed station for engaging a trailing end of said group of articles in said infeed station to retain said group of articles in a facewise nested condition in said infeed station while said shuttle returns to said separating station to receive a subsequent group of articles; and a pick-and-place apparatus for receiving a group of articles from said infeed station, said pick-and-place apparatus having a pair of elongate, pivotally mounted gripping arms for grippingly engaging a group of articles in said infeed station, a tension device for holding said arms in a closed condition for engagement about a group of articles and a cam device for overcoming said tension device and pivoting said arms oppositely outwardly to an open condition for passing around said group of articles.

14. Apparatus according to claim 13 wherein said cam comprise control rod projecting outwardly of one end of each of said elongate pivotally mounted gripping arms and cam track mounted adjacent said infeed station and configured for engaging said control rod for pivoting said gripping arms outwardly to said open condition and for allowing said arms to pivot inwardly for engagement with said group of articles as said control rod follow said cam track.

15. Apparatus according to claim 14 wherein said cam track portion includes a cam track portion and a drive portion for moving said cam track portion into and out of a position for engagement with said control rod for permitting said gripping arms to open and close to receive a group of articles and for permitting removal of said group of articles from said infeed lane by said gripping arms.

* * * * *